Dec. 8, 1964 J. C. CHUPA 3,160,691
METHOD OF MAKING AN INFLATABLE VALVED ARTICLE
Original Filed May 12, 1954
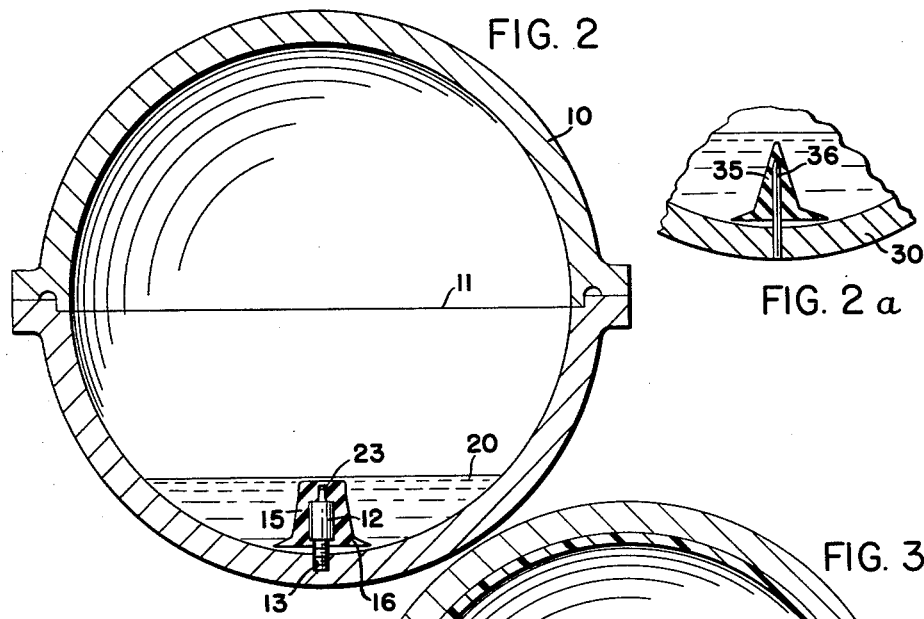
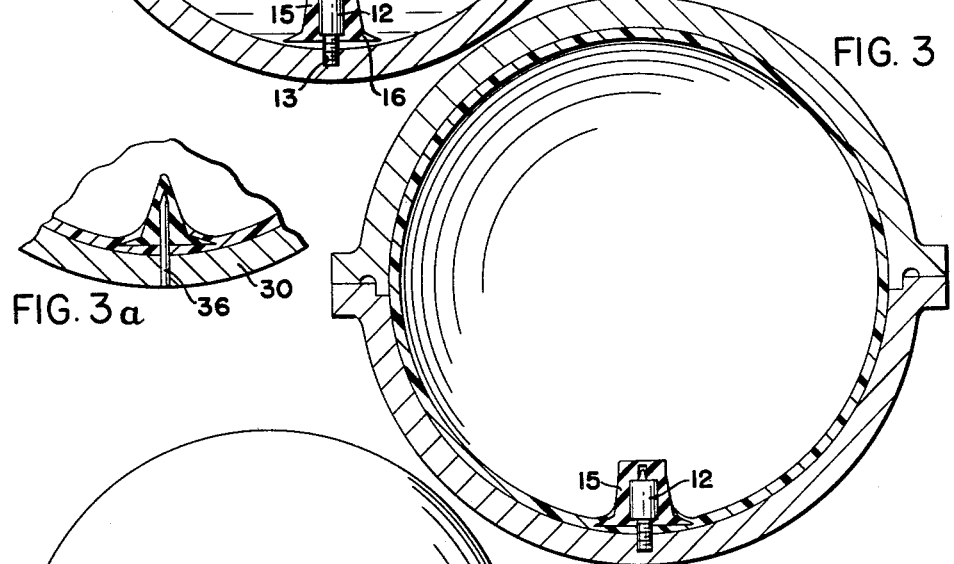
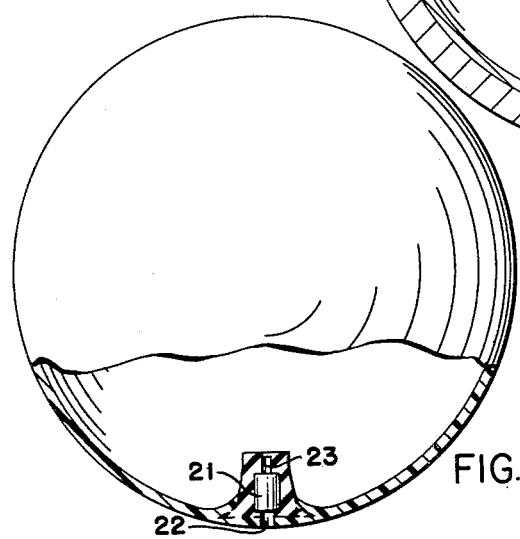
INVENTOR.
JOHN C. CHUPA
BY Ely, Pearne & Gordon
ATTORNEYS 3,160,691
METHOD OF MAKING AN INFLATABLE
VALVED ARTICLE
John C. Chupa, Sandusky, Ohio, assignor to The Barr
 Rubber Products Company, Sandusky, Ohio, a corporation of Ohio
Original application May 12, 1954, Ser. No. 429,161, now Patent No. 2,935,320. Divided and this application May 4, 1959, Ser. No. 810,773
2 Claims. (Cl. 264—310)

The present invention relates to the making of inflatable balls or similar inflatable objects which are provided with a valve structure opening through one portion of the wall of the inflatable object.

This application is a divisional application with respect to my copending application Serial No. 429,161 filed May 12, 1954, now Patent No. 2,935,320.

The invention is particularly applicable to making of inflatable objects designed to be inflated through use of an inflating needle. However, the invention may also be employed where other inflating methods are contemplated, as will become clear below.

An object of the invention is to provide an inexpensive method of manufacturing an inflatable object by simultaneously forming the article and incorporating the valve structure therewithin.

Another object of the invention is to provide a rugged, durable inflatable object which is inexpensive to manufacture and which has a valve means which is simple and foolproof in operation.

A further object of the invention is to provide a self-sealing valve which has an unusually long service life and which is particularly easy to use because of the provision of a lubricant-sealant valve material as disclosed below.

These and other objects and advantages of the invention wil be more clearly understood from a reading of the following specification and the accompanying drawings in which:

FIGURE 1 is a partially broken-away view of an inflatable ball made according to the present invention.

FIGURE 1a is a view similar to the broken-away portion of FIGURE 1, showing another inflatable ball made according to the invention and employing an alternative form of valve.

FIGURE 2 is a cross-sectional view of a mold set-up employed in producing the ball shown in FIGURE 1.

FIGURE 2a is a partial cross-sectional view of a mold set-up employed in producing the ball shown in FIGURE 1a.

FIGURE 3 is a view similar to FIGURE 2 but at a later stage of manufacture.

FIGURE 3a is a view similar to FIGURE 2a but at a later stage of manufacture.

Shown in FIGURE 2 is a mold fabricated preferably from aluminum. The illustrated mold is spherical in shape in order to produce balls, but it will be apparent that a variety of other shapes may be formed. The parting line of the mold is shown at 11. In the wall of one of the mold halves, a mounting pin or peg 12 is provided, the peg 12 being fixed to the mold wall in any suitable manner. In FIGURE 2 the peg 12 is shown as threadedly mounted in a tapped hole 13 formed in the wall of the mold.

A valve body 15 is mounted on the peg 12 within the mold 10, as shown in FIGURE 2. This valve body may be conventional in shape, being adapted to receive a valve plug which is pressed into the seat formed by the peg 12 after fabrication of the molded article. The outer end or skirt 16 of the valve body is slightly spaced from the mold wall; for a ball of conventional size, this space may be about 1/16 inch.

In practicing the present invention, a suitable synthetic plastisol is preferably employed as the molding material. One formulation which has been found suitable for molding articles of the type described is set forth below:

|  | Parts by weight |
|---|---|
| High molecular weight polyvinyl chloride in form of a fine white powder, specific gravity approx. 1.4 | 60 |
| Polyvinylchloride acetate copolymer, 96%+vinyl chloride, less than 4% vinyl acetate | 13⅓ |
| Triethylene glycol di-(2-ethyl hexoate) | 13⅓ |
| Dioctyl phthalate | 13⅓ |
| Cadmium naphthenate dissolved in plasticizer type carrier, approx. 1:1 (stabilizer) | 2 |
| Titanox (color) | 3 |

The mix 20 may be deposited in the mold 10 as shown in FIGURE 2. The mold is then rotated around several axes of rotation in order to cause the mix to be distributed evenly around the inside surface of the mold. The amount of mix provided in the mold is sufficient to cause the wall thickness of the distributed mix to exceed the spacing between the outer end of the valve body and the mold wall. Thus, as shown in FIGURE 3, the outer wall-adjoining end of the valve body is surrounded by the wall of distributed mix.

The rotating mold is then heated to a temperature of about 165° C., the resin being thereby caused to gel and fuse in the conformation of the mold. Final heat of fusion is not necessarily applied during rotation of the mold, although generally it is most expedient to continue mold rotation during both gelling and fusing. The cast article is then stripped from the mold and allowed to cool. The conformation of the final cast product is shown in FIGURE 1. A resilient plug 21 is forced through the orifice or opening 22 and is received within the inner seat of the valve body formed by the peg 12.

The valve body 15 is preferably also formed as a plastisol which has been pre-molded to shape prior to the above described operations. The nature of these plastisols is such that at least partial fusion between the valve body and the article wall will occur when the mold 10 is heated in order to set the article wall.

The plug 21 may also comprise a pre-cast plastisol element. The valve structure is adapted to receive an inflating needle through the orifice 22, the needle puncturing the plug 21 and passing down through a further needle guide passage 23 and through the inner end of the valve body to communicate directly with the interior of the ball when the ball is being inflated. When the needle is withdrawn, the soft plug 21 expands inwardly to close off the passageway made by the needle.

It will be seen that the manner of using this self-sealing valve is somewhat similar to the use of conventional self-sealing valves which employ a soft plug and are adapted to be inflated with an inflating needle. Such valves of the prior art have been relatively short-lived because the valve plug soon loses its life and does not completely seal the valve. Furthermore, such prior art products have been very difficult to use in that the compressed plug is very difficult to puncture manually, even when a sharp needle is employed. These valves were frequently poorly bonded or adhere to the wall of the cast body, and the exposed edge of the cemented or welded juncture was particularly subject to wear and failure.

The present valve is relatively easy to penetrate and has a long service life compared to the valves of the prior art. A particular advantage of the valve is that the plug 21 may be made from a synthetic plastisol resin with a relatively high plasticizer content which serves, on the one hand, to lubricate a penetrating needle, and, on the other hand, to render more positive the self-sealing operation of the plug. The tendency of the plastisol to bleed toward the surface of the plug is apparently responsible in large measure for these highly desirable characteristics. An exemplary formula having the relatively high plasticizer content which it is desirable to use in making the sealing portions of the valve (in this case the plug 21) is set forth below:

| | Parts by weight |
|---|---|
| High molecular weight polyvinyl chloride in form of a fine white powder, specific gravity approx. 1.4 | 40 |
| Polyvinylchloride acetate copolymer, 96%+vinyl chloride, less than 4% vinyl acetate | 20 |
| Triethylene glycol di-(2-ethyl hexoate) | 20 |
| Dioctyl phthalate | 20 |
| Cadmium naphthenate dissolved in plasticizer type carrier, approx. 1:1 (stabilizer) | 2 |
| Titanox (color) | 3 |

Thus, it will be seen that I have provided for the manufacture of a self-sealing valve which has an unusually long service life, which remains convenient to use even after long periods of shelf storage and in which the valve body is not directly exposed but rather is contained within and preferably fused with the wall of the cast article. Further, the invention reduces manufacturing costs and reduces the incidence of rejects by eliminating the necessity of separate sealing or welding or vulcanizing operations which formerly had to be performed in order to affix the valve body on the wall of the cast article.

In FIGURES 1a, 2a and 3a, I have illustrated an alternative form of the invention which also provides an article having a valve adapted to be used with an inflating needle. A mold 30 is provided similar in all respects to the mold 10. A valve housing 35 is mounted on a needle 36 which is press-fitted into the wall of the mold 30. The valve housing 35 is of an unconventional shape and is not adapted to contain a plug equivalent to the plug 21. The valve housing 35 is preferably made from a synthetic plastisol resin having a relatively high plasticizer content, the formula given in connection with the plug 21 being suitable for this purpose. In all other respects, the example of the invention which is illustrated in FIGURES 1a, 2a and 3a is similar to the previous description of FIGURES 1, 2 and 3.

It will be seen that the valve shown in FIGURES 1a, 2a and 3a is simplified in that no plug insert is necessary. As seen in FIGURE 1a, the final product is adapted to receive an inflating needle through the orifice 37 and the passage 38. The needle is simply inserted through the orifice and passage and penetrates the inner tip of the valve housing. When the inflating needle is withdrawn, the inner tip of the housing acts as its own self-sealing closure. Again, with the relatively high plasticizer content of the valve housing, lubrication is provided for the easy penetration of the needle and for more positive self-sealing operation of the valve. Also, in this example as in the previous example, a valve is provided which is not directly exposed but rather is contained within and fused with the wall of the cast article. It will be obvious that this feature may be provided in articles which contain valves which are not designed to be employed with an inflating needle. For example, a conventional inner tube type valve may be mounted in a housing equivalent to the housings 15 and 35, and may be contained within and fused with the wall of the cast article in the manner disclosed above, access to the middle portion of the valve being had through an orifice equivalent to the orifices 22 and 37, such orifices being formed by a mold pin or peg equivalent to the pins 12 and 36.

Still other alternatives to the specifically disclosed examples of the invention will readily occur to those familiar with the manufacture of cast air-inflatable articles. Accordingly, the scope of the invention is not to be restricted to the details of the above disclosure but is to be defined by the following claims.

What is claimed is:

1. The method of making an air-inflatable article containing a valve structure therewithin comprising the steps of providing a hollow sectional mold with a pin extending inwardly from an inner wall of said mold and with the projecting portion of the pin exposed to the mold interior, positioning a valve structure on said pin spaced a given distance from said mold wall, placing a substantially liquid mixture consisting essentially of a resin and a plasticizer therefor in said mold for subsequent distribution as a layer over the inner surface of the mold cavity, the measure of said mixture being sufficient to cause the thickness of said layer in the vicinity of said valve structure to exceed said given distance but being insufficient to allow said layer to entirely cover said valve structure, closing said mold, rotating said mold in a multiplicity of planes to distribute said mixture as said layer, heating said layer while the mold is rotating to gel it against the inner surfaces of the mold and against said valve structure, and applying additional heat to fuse the gelled layer, cooling the layer below its fusing temperature, opening the mold and removing the article therefrom.

2. The method of making an air-inflatable article containing on a wall thereof an inwardly extending valve structure comprising the steps of placing a valve structure on a pin extending partially into the mold cavity of a hollow sectional mold, the extending portion of the pin being directly exposed to the mold cavity prior to said emplacement of said valve structure, said pin being so mounted on an inner wall of said hollow sectional mold that the valve structure is spaced a given distance from said mold wall, placing a substantially liquid mixture consisting essentially of a resin and a plasticizer therefor in the mold cavity for subsequent distribution as a layer over the inner surface of the mold cavity, the measure of said mixture being sufficient to cause the thickness of said layer in the vicinity of said valve structure to exceed said given distance but being insufficient to allow said layer to entirely cover said valve structure, closing said mold, rotating said mold in a multiplicity of planes to distribute said mixture as said layer, heating said layer while the mold is rotating to gel it against the inner surfaces of the mold and against said valve structure, and applying additional heat to fuse the gelled layer, cooling the layer below its fusing temperature, opening the mold and removing the article therefrom.

References Cited by the Examiner

UNITED STATES PATENTS

| 2,473,722 | 6/49 | Nelson | 18—58 XR |
| 2,477,899 | 8/49 | Rempel | 18—58.3 |
| 2,569,869 | 10/51 | Rempel | 18—58.3 |
| 2,730,765 | 1/56 | Crafton et al. | 18—26 |
| 2,760,775 | 8/56 | Tipton | 18—58 XR |
| 2,763,031 | 9/56 | Rekettye. | |